UNITED STATES PATENT OFFICE.

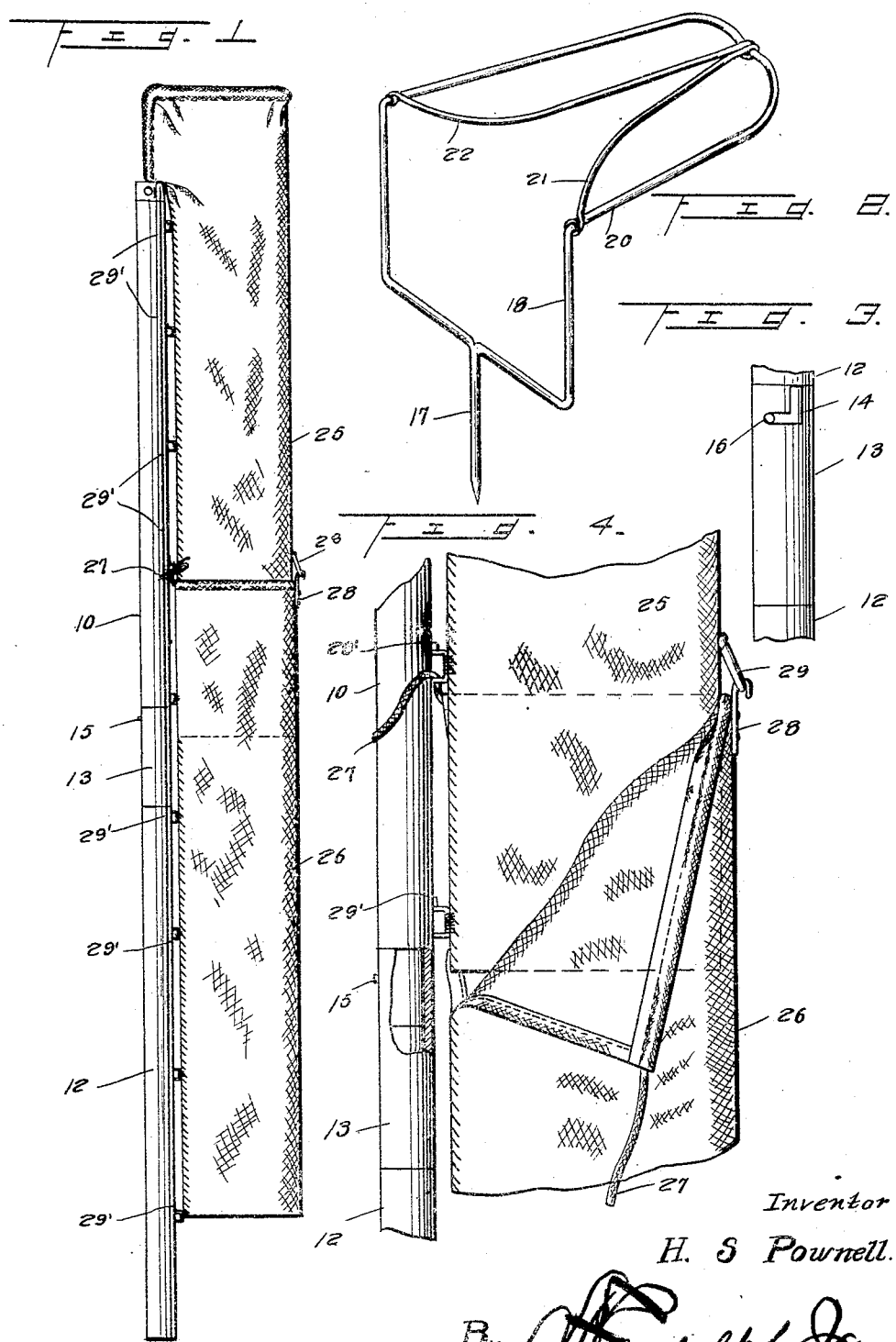

HENRY S. POWNELL, OF OTTUMWA, IOWA.

FRUIT-PICKER.

1,367,889.

Specification of Letters Patent.   Patented Feb. 8, 1921.

Application filed March 13, 1920. Serial No. 365,576.

*To all whom it may concern:*

Be it known that I, HENRY S. POWNELL, a citizen of the United States, residing at Ottumwa, in the county of Wapello and State of Iowa, have invented certain new and useful Improvements in Fruit-Pickers; and I do hereby declare the following to be a full, clear, and exact description of the invention, such as will enable others skilled in the art to which it appertains to make and use the same.

This invention relates to a fruit picker, and one object of the invention is to provide a device which may be used for gathering apples, pears, oranges and various other fruits, the device being so constructed that not only the handle but the delivery chute shall be formed in sections, so that the effective length of these elements may be varied to suit the condition under which the device is used.

A further object is to provide a device of the type indicated and formed in sections as specified, the chute being adapted to deliver the fruit directly into the hands of the individual using the device, so that there may be no danger of bruising the fruit by contact with any solid article, or by contact between the individual articles of fruit.

A still further object is to provide an efficient device which shall be of light construction, and which shall necessitate the employment of a pole of a length sufficient only to serve the particular purpose required at a given time, the pole and the chute connected therewith being extended as circumstances require.

A still further object is to provide a device which shall include a pole formed in a plurality of sections having telescoping connections with each other, the chute being also formed in sections, the adjacent sections overlapping and being properly secured: the upper section of the chute having connection with means for directly engaging the fruit stems, and the points of engagement being such that the fruit when separated from the branch shall be directly over, or in face within the upper end of the chute.

With the foregoing and other objects in view, the invention consists in the novel construction, combination, and arrangement of elements hereinafter described and claimed.

In the accompanying drawings:

Figure 1 discloses the device in side elevation.

Fig. 2 is a perspective view of the frame mounted at the upper end of the chute and serving to retain in position the devices for severing the fruit from the stem.

Fig. 3 is a fragmentary detail view showing the manner of connecting the two detached sections of the pole.

Fig. 4 is a detail view showing the manner of connecting the overlapping portions of the chute.

Referring to the drawings in detail, two attached sections of the pole are designated 10 and 12, one of these sections being provided with a ferrule 13 having a bayonet slot 14 therein. The other section of the pole is provided with a pin 15 coöperating with the bayonet slot and adapted to retain the sections together when they have been connected for use.

Connected with the upper end of the pole is a frame one element of which, extending vertically, is U-shaped and is provided with a shank portion 17 projecting into the pole and being secured thereto. The vertically extending U-shaped portion just mentioned is designated 18 and provides an opening in the side of the chute at the upper end thereof, for the purpose indicated below. Formed integrally with the frame 18 is a horizontally extending U-frame 20, and mounted therein in the position shown are a plurality of elements 21 and 22 which may be termed blades, since they separate the fruit from the twigs.

The chute is formed in sections as previously indicated, and in the drawings there are shown two of such sections, it being understood that each section of the pole also carries a chute section. In making this statement the lower section of the pole may be excepted, in order that sufficient room may be provided for readily handling the device.

The sections of the chute here shown are designated at 25 and 26 and they overlap in the manner indicated, forming a type of telescoping connection, any suitable securing device being provided, such as a draw string 27. A more positive connection is also provided by employing a hook 28 and a ring 29, providing for suspending one section from the other. Staples, screws, or any suitable devices are mounted on the pole at intervals, as shown at 29', and the sections of the chute are secured thereto, by stitching or in any suitable manner.

The upper end of the upper chute section is cut away at one side, and the edges of the cut away portion and of the top are secured to the horizontal and vertical elements of the frame.

It will be observed that the cutting or engaging devices which contact with the stem of the fruit will permit the latter to be severed from the twig directly over the end of the chute and within the mouth thereof, so that the fruit will fall in a direct line, and may be received in the hand of the operator, without coming into contact with an obstruction of any character, and without danger of one piece of fruit contacting with another and thereby becoming bruised. The device may be employed under practically all conditions, and will enable the operator to gather a much greater quantity of fruit in a given time than it would be otherwise possible to do, all the fruit being in good condition, so far as the picking operation is concerned. It may be further noted that the necessity of using ladders is entirely obviated, even though some of the fruit may be in such position that it would ordinarily be inaccessible. The extension handle and chute are especially adapted to such conditions.

What I claim is:

In a fruit picker, a one piece frame comprising a U-member, the ends of which are deflected downwardly at right angles to the plane of the U-member when it is in a horizontal plane to form approximately right angled portions and are deflected thence toward each other at right angles, a downwardly extending shank portion formed at the juncture of the portions extending toward each other, fruit detaching members connected with the middle portion of the U-frame and diverging to points in connection with opposite sides of the frame at the angular portions first named, a handle connected with the shank, and a chute having an open end the edge portions of which are connected with the U-portion of the frame, the upper sides of the chute being provided with an opening the edge portions of which are connected with the downwardly deflected portions of the frame.

In testimony whereof I affix my signature in presence of two witnesses.

HENRY S. POWNELL.

Witnesses:
 ORPHA BAKER,
 ISAL McREYNOLDS.